(12) United States Patent
Jang et al.

(10) Patent No.: US 10,361,579 B2
(45) Date of Patent: Jul. 23, 2019

(54) VEHICLE CHARGER

(71) Applicants: Hyundai Motor Company, Seoul (KR); Kia Motors Corporation, Seoul (KR)

(72) Inventors: Young Jin Jang, Gyeongsangbuk-do (KR); Hyung Souk Kang, Seoul (KR); Soung Han Noh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 53 days.

(21) Appl. No.: 15/612,107

(22) Filed: Jun. 2, 2017

(65) Prior Publication Data
US 2018/0175652 A1   Jun. 21, 2018

(30) Foreign Application Priority Data
Dec. 15, 2016  (KR) ........................ 10-2016-0171604

(51) Int. Cl.
*H02J 7/00* (2006.01)
*H02J 7/02* (2016.01)
(Continued)

(52) U.S. Cl.
CPC .............. *H02J 7/022* (2013.01); *B60L 53/14* (2019.02); *B60L 53/20* (2019.02); *B60L 58/12* (2019.02);
(Continued)

(58) Field of Classification Search
USPC ....................................................... 320/137
See application file for complete search history.

(56) References Cited

U.S. PATENT DOCUMENTS

| 2013/0193922 | A1* | 8/2013 | Park | ........................ | B60L 3/00 |
| | | | | | 320/109 |
| 2014/0176045 | A1* | 6/2014 | Naskali | ................. | H02J 7/0054 |
| | | | | | 320/103 |

(Continued)

FOREIGN PATENT DOCUMENTS

| KR | 2013-0090678 A | 8/2013 |
| KR | 2014-0084369 A | 7/2014 |

OTHER PUBLICATIONS

Machine Translation of KR2013090678, 2013.*

*Primary Examiner* — Samuel Berhanu
(74) *Attorney, Agent, or Firm* — Mintz Levin Cohn Ferris Glovsky and Popeo, P.C.; Peter F. Corless

(57) ABSTRACT

A charger is provided to convert AC power to generate DC power capable of charging an energy storage device. The charger includes a switching circuit unit that applies or blocks AC power input from the outside and a power factor correction circuit unit that converts the AC power applied from the switching circuit unit into DC power. A DC-DC converter then converts a voltage level of the DC power converted by the power factor correction circuit and supplies the converted voltage level of the DC power to an energy storage device. A capacitor configured is shunt-connected between the power factor correction circuit unit and the DC-DC converter. A controller operates the switching circuit unit and the power factor correction circuit unit to charge the capacitor with a predetermined voltage at an initial charging operation of the energy storage device.

11 Claims, 4 Drawing Sheets

(51) Int. Cl.
*H02J 7/34* (2006.01)
*H02M 1/42* (2007.01)
*H02M 7/217* (2006.01)
*B60L 53/14* (2019.01)
*B60L 53/20* (2019.01)
*B60L 58/12* (2019.01)
*H02J 7/10* (2006.01)

(52) U.S. Cl.
CPC ........... *H02J 7/345* (2013.01); *H02M 1/4225* (2013.01); *H02M 7/217* (2013.01); *B60L 2210/10* (2013.01); *B60L 2210/30* (2013.01); *B60L 2240/54* (2013.01); *H02J 2007/10* (2013.01)

(56) References Cited

U.S. PATENT DOCUMENTS

| 2014/0176049 A1* | 6/2014 | Yamada | H02J 7/02 320/107 |
| 2015/0012151 A1* | 1/2015 | Park | G05B 15/02 700/298 |

* cited by examiner

VEHICLE CHARGER

CROSS REFERENCE TO RELATED APPLICATION

The present application claims priority to Korean Patent Application No. 10-2016-0171604, filed on Dec. 15, 2016, the entire contents of which is incorporated herein for all purposes by this reference.

BACKGROUND

1. Technical Field

The present invention relates to a charger, and more particularly, to a charger that converts alternating current (AC) power to generate direct current (DC) power to charge an energy storage device.

2. Description of the Related Art

An electric vehicle or a plug-in hybrid vehicle includes a charger that receives AC power from an external power supply device and converts the AC power into DC power to charge an energy storage device such as a battery within a vehicle. The charger used in such a vehicle generally includes a power factor correction circuit that converts AC power into DC power and corrects a power factor, and a DC-DC charging circuit that converts a voltage level of a DC power output of the power factor correction circuit to a level of a charging voltage of a battery. A capacitor that forms a DC link is disposed at a connection end of the power factor correction circuit and the DC-DC charging circuit.

Typically, to prevent the capacitor from being damaged by an abrupt rush current when the charger is connected to the external power supply device, the charger includes an initial charging resistor and a relay connected in parallel at an input terminal of the power factor correction circuit. The charger is configured to open the relay to allow a current to flow through the initial charging resistor before the external power supply and the charger are connected, and is configured to charge a capacitor with a limited current from the outside through the initial charging resistor when being applied with power from the outside. Further, after the capacitor is charged at a predetermined voltage level or greater, the relay is shorted to apply the power supplied from the outside to the power factor correction circuit.

However, the initial charging resistor used in the existing charger should withstand a substantial amount of power and therefore is large in size and high in cost. Further, the initial charging resistor receives a substantial load every time charging is performed, and therefore the lifespan may easily deteriorate and is also vulnerable to a shock due to the size thereof. The initial charging resistor also consumes electrical energy as thermal energy, and therefore is also disadvantageous in terms of energy efficiency. In addition, since a front end of the initial charging resistor and the relay connected in parallel requires an additional relay for forming or blocking an electrical connection with the external power supply device, size and cost increase as the number of relays increases.

The contents described as the related art have been provided merely for assisting in the understanding for the background of the present invention and should not be considered as corresponding to the related art known to those skilled in the art.

SUMMARY

An object of the present invention is to provide a charger capable of eliminating an initial charging resistor and a relay connected in parallel with the initial charging resistor and a relay disposed at a front end of the initial charging resistor for blocking or applying external AC power and solving an overcurrent rush problem during initial charging.

According to an exemplary embodiment of the present invention, a charger may include: a switching circuit unit configured to apply or block AC power input from the outside; a power factor correction circuit unit configured to convert AC power applied from the switching circuit unit into DC power; a DC-DC converter configured to convert a voltage level of the DC power converted by the power factor correction circuit and supply the converted voltage level of the DC power to an energy storage device; a capacitor configured to be shunt-connected between the power factor correction circuit unit and the DC-DC converter; and a controller configured to operate the switching circuit unit and the power factor correction circuit unit to charge the capacitor with a predetermined voltage at an initial charging operation of the energy storage device.

The controller may be configured to open the switching circuit unit prior to starting the charging operation and perform the PWM control on the switching circuit unit when the charging operation starts to supply a current to the capacitor. The power factor correction circuit unit may include an inductor having a first end connected to the switching circuit unit, a diode having an anode connected to a second end of the inductor and a cathode connected to a first end of the capacitor, and a switching element that forms or blocks an electrical connection between a connecting end of the inductor and the anode and a second end of the capacitor and the controller may be configured to operate the switching circuit unit to be open/shorted and the switching element to be open/shorted to adjust a voltage applied to the capacitor. The controller may further be configured to open the switching circuit prior to starting the charging operation, perform a PWM control on the switching circuit unit when the charging operation starts to open the switching element to charge the capacitor, and short the switching circuit unit and perform the PWM control on the switching element when the capacitor is charged at a preset voltage level or greater.

The switching circuit unit may include a first MOSFET and a second MOSFET having a gate commonly receiving a control signal from the controller, each source of the first MOSFET and the second MOSFET may be connected to each other and each drain thereof may be connected to an AC power input terminal and an input terminal of the power factor correction circuit unit one by one. Alternatively, each drain of the first MOSFET and the second MOSFET may be connected to each other. Additionally, each source thereof may be connected to the AC power input terminal and the input terminal of the power factor correction circuit unit one by one. The charger may further include: a diode rectifier circuit unit disposed between the switching circuit unit and the power factor correction circuit unit.

According to another exemplary embodiment of the present invention, a charger may include: a switching circuit unit configured to apply or block AC power input from the outside; a diode rectifier circuit unit configured to rectify power applied through the switching circuit unit; a power factor correction circuit unit configured to convert output power of the rectifier circuit unit into DC power and be implemented as a boost converter topology including an inductor, a switching element, and a diode; a DC-DC converter configured to convert a voltage level of the DC power converted by the power factor correction circuit and supply the converted DC power to an energy storage device; a capacitor configured to be shunt-connected between the power factor correction circuit unit and the DC-DC converter; and a controller configured to operate the switching circuit unit and the power factor correction circuit unit to charge the capacitor with a predetermined voltage at an initial charging operation of the energy storage device.

The controller may be configured to open the switching circuit unit prior to starting the charging operation, open the switching element when the charging operation starts and perform PWM control on the switching circuit unit to operate a circuit configured of the switching circuit unit, the diode rectifier circuit unit, and the inductor as a buck converter, and short the switching circuit unit and perform the PWM control on the switching element to operate the power factor correction circuit unit as a boost converter when the capacitor is charged at a preset voltage level or greater by the buck converter control.

The switching circuit unit may include a first MOSFET and a second MOSFET having a gate commonly receiving a control signal from the controller, each source of the first MOSFET and the second MOSFET may be connected to each other and each drain thereof may be connected to an AC power input terminal and an input terminal of the power factor correction circuit unit one by one. Alternatively, each drain of the first MOSFET and the second MOSFET may be connected to each other and each source thereof may be connected to the AC power input terminal and the input terminal of the power factor correction circuit unit one by one.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
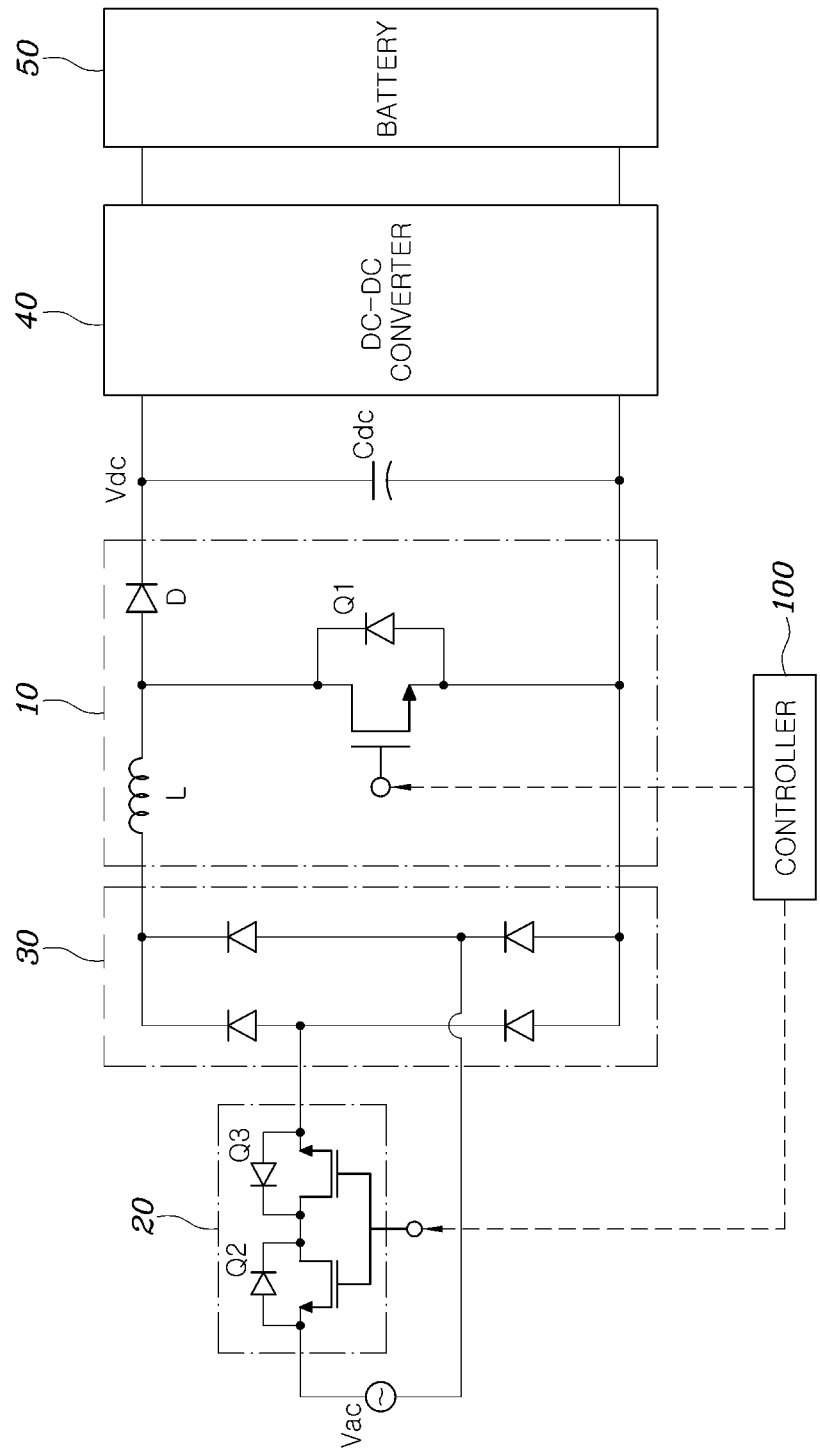
FIG. 1 is a circuit diagram schematically illustrating a charger according to an exemplary embodiment of the present disclosure.

A charger according to various exemplary embodiments of the present invention will be described with reference to the accompanying drawings. FIG. 1 is a circuit diagram schematically illustrating a charger according to an exemplary embodiment of the present disclosure. Referring to FIG. 1, a charger according to an exemplary embodiment of the present invention may include a switching circuit unit 20, a power factor correction circuit unit 10, a DC-DC converter 40, a capacitor Cdc, and a controller 100. The controller 100 may be configured to operate the other components of the charger.

Particularly, the switching circuit unit 20 may include switching elements Q2 and Q3 configured to open/shorted (e.g. opened or closed state) based on a control signal output from the controller 100. The switching circuit unit 20 may be disposed between external AC power input to the charger and the power factor correction circuit unit 10 to be operated to be in a shorted or open state, to thus apply or block the AC power to and from the power the power factor correction circuit unit 10 based on the state.

The switching circuit unit 20 may be implemented as various switching elements as well known in the art to which the present invention pertains. For example, the switching circuit unit 20 may be configured to include two MOSFETs Q2 and Q3. In particular, each source of the two MOSFETs Q2 and Q3 may be connected to each other or drains thereof may be connected to each other. When the sources of the MOSFETs Q2 and Q3 are connected to each other, each drain of the MOSFETs Q2 and Q3 may be connected to an AC power input terminal and an input terminal of the power factor correction circuit unit 10 one by one (e.g., sequentially) and when the drains of the MOSFETs Q2 and Q3 are connected to each other, each source thereof may be connected to the AC power input terminal and the input terminal of the power factor correction circuit unit 10 one by one (e.g., sequentially).

The connection relationship is based on an internal diode connection relationship of the MOSFETs Q2 and Q3. When one MOSFET is used, power may be applied by the MOSFET internal diode based on the alternating of the AC power. For example, under the assumption that the switching circuit unit is implemented by one MOSFET and the source of one MOSFET is connected to the AC power input terminal and the drain thereof is connected to the input terminal of the power factor correction circuit unit 10, when the AC power is positive, a reverse voltage may be applied to the internal diode of the MOSFET even when the one MOSFET is open to block the supply of power. However, when the AC power is negative, a forward voltage may be applied to the internal diode of the MOSFET even when the one MOSFET is open to apply a negative voltage to the input terminal of the power factor correction circuit unit 10. Accordingly, the switching circuit unit 20 may interconnect the two MOSFETs Q2 and Q3 by the connection structure as described above to block power from being applied by the MOSFET internal diode based on the alternating of the AC power. A control signal received by the controller 100 may be commonly input to the gates of the two MOSFETs Q2 and Q3.

The power factor correction circuit unit 10 is an element configured to convert the AC power supplied from the external power supply device into DC power and output the power and adjust the power factor of the transmitted power. For example, the power factor correction circuit unit 10 may be configured by applying a topology of a boost converter that includes an inductor, a switching element, and a diode. In other words, as illustrated in FIG. 1, the power factor correction circuit unit 10 may include an inductor L having a first end connected to the switching circuit unit 20, a diode D having an anode connected to a second end of the inductor and a cathode connected to a first end of the capacitor Cdc, and a switching element Q1 that forms or blocks an electrical connection between a connection end of the inductor L and the diode D and a second end of the capacitor C.

Further, the power factor correction circuit unit 10 may operate as a boost converter by performing a PWM control on the switching element Q1 after performing the initial charging operation of the capacitor C. In addition, a rectifying circuit unit 30 configured to rectify AC power may be disposed between the switching circuit unit 20 and the power factor correction circuit unit 10. The rectifying circuit unit 30 may include a diode rectifying circuit unit 30 having a full bridge circuit that is configured of four diodes. The DC-DC converter 40 may be configured to convert a level of a DC voltage input from the power factor correction circuit unit 10 and output the DC voltage at a voltage level suitable for charging the battery 50. For example, the DC-DC converter 40 may be implemented as a topology of an insulated DC-DC converter circuit including a transformer for electrical insulation.

Figure 2:
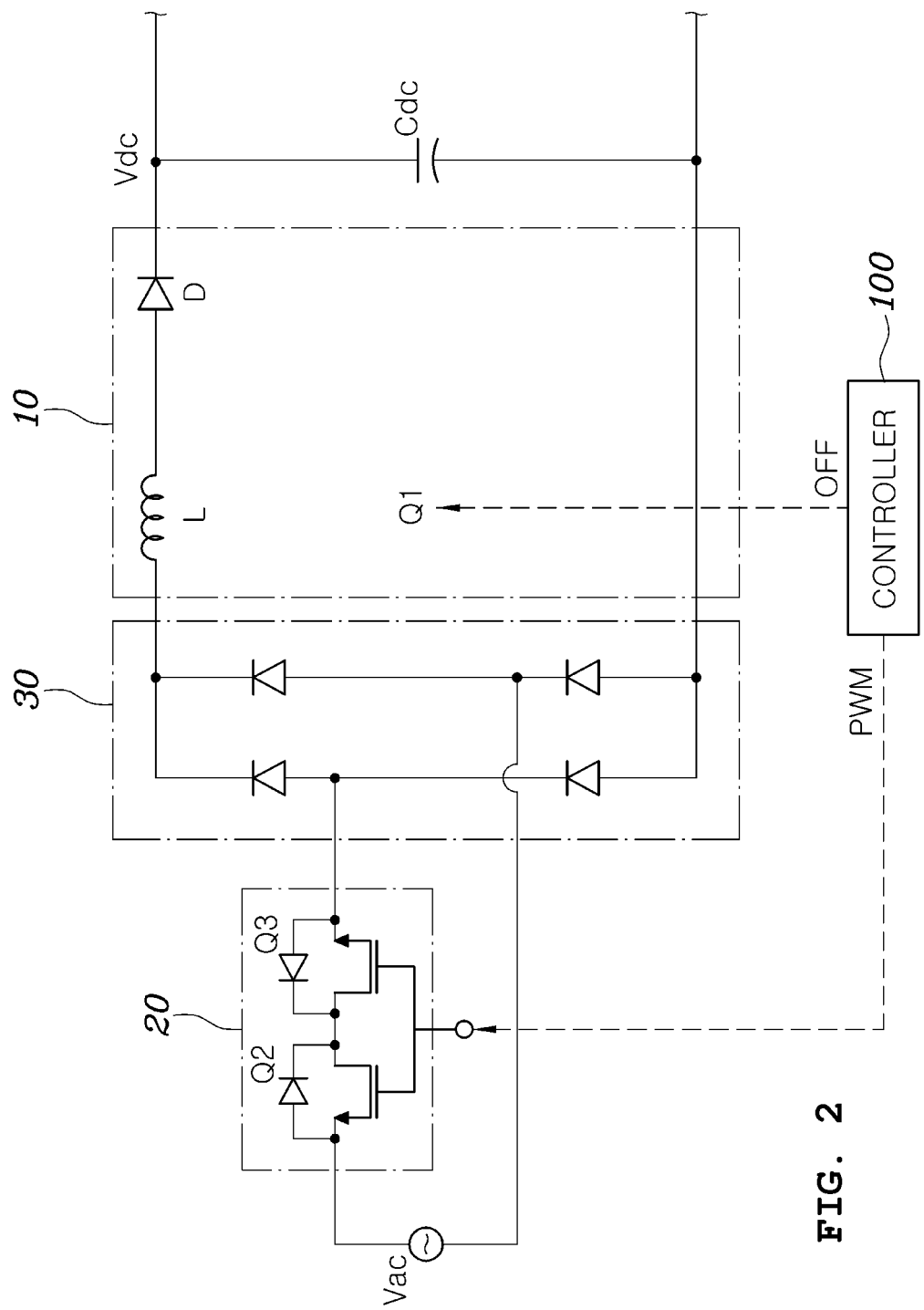
FIGS. 2 and 3 are circuit diagrams illustrating a circuit configuration of each operation mode of the charger according to the exemplary embodiment of the present invention.
Figure 3:
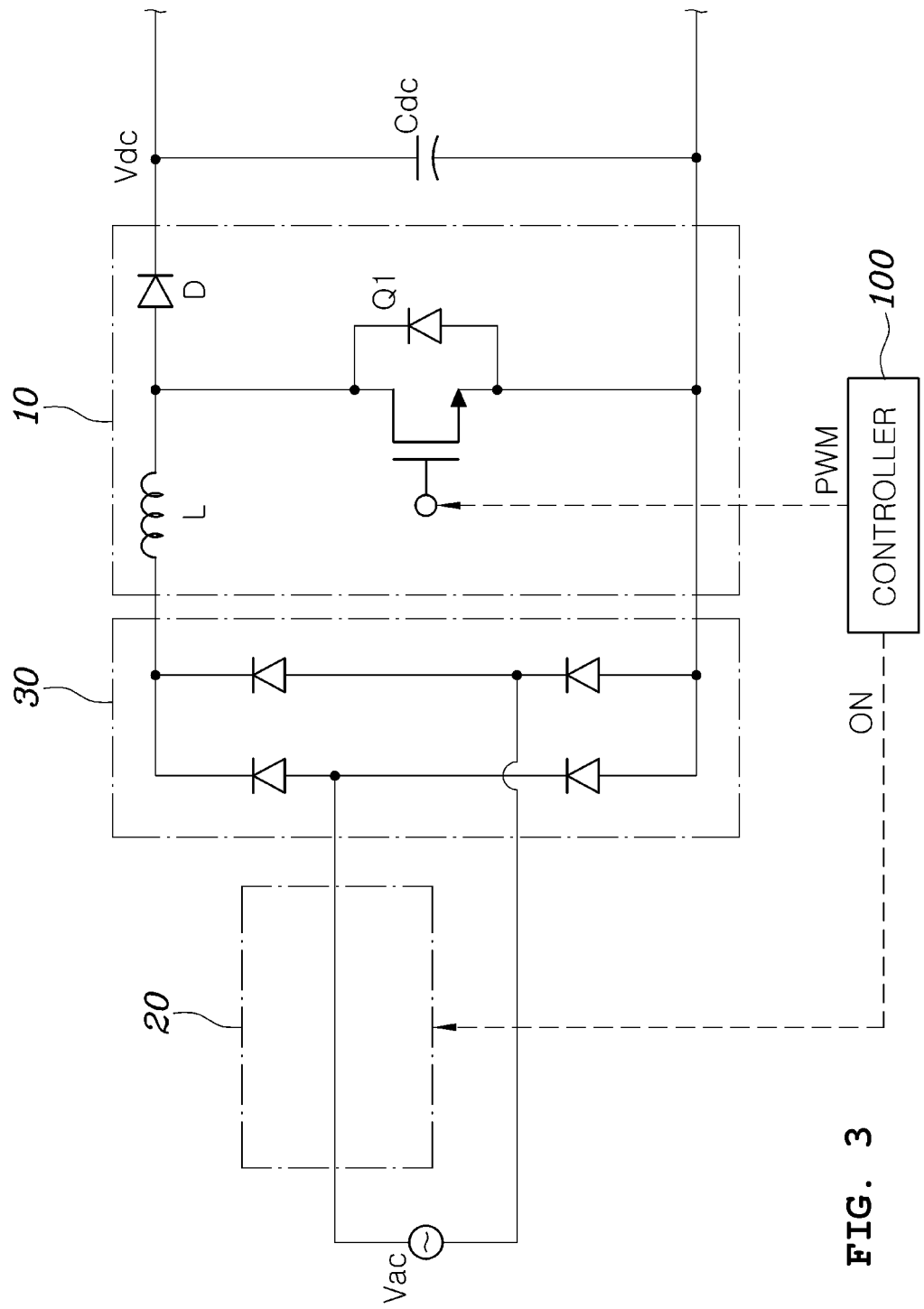
Figure 4:
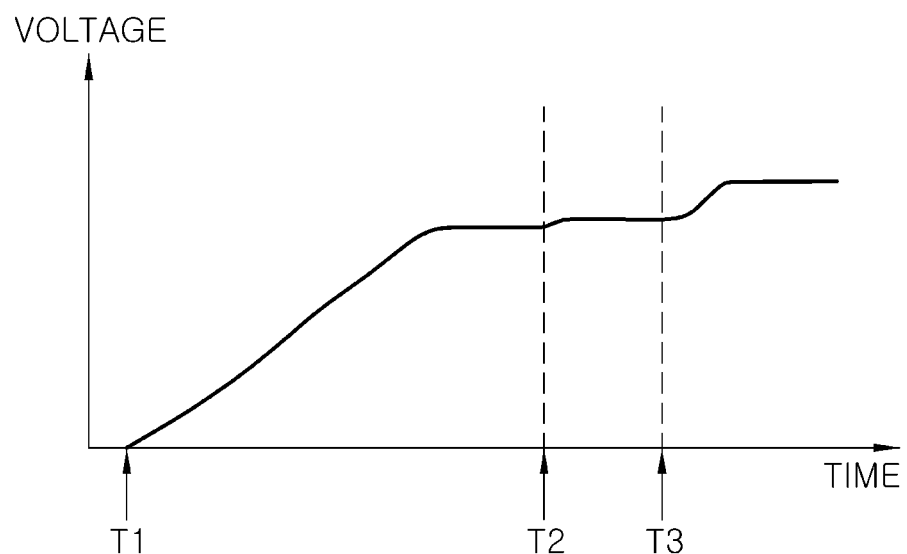
FIG. 4 is a graph illustrating a change in a capacitor voltage of the charger according to the exemplary embodiment of the present invention.

FIGS. 2 and 3 are circuit diagrams illustrating a circuit configuration of each operation mode of the charger according to the exemplary embodiment of the present invention and FIG. 4 is a graph illustrating a change in a capacitor voltage of the charger according to the exemplary embodiment of the present invention. The controller 100 may be configured to operate the switching circuit unit 20 to maintain the switching elements Q2 and Q3 in the open state at the initial state of the charger, that is, before the external AC power is applied to the charger (before time 'T1' of FIG. 4). For example, when the charger according to an exemplary embodiment of the present invention is an on-board charger mounted within a vehicle, even when a connector of an external charging facility is connected to a charging port disposed at an input terminal of the charger, the switching circuit unit 20 may be maintained in the open state before receiving the input for starting the charging operation and thus, the AC power provided from the external charging facility may be prevented from being applied to circuits at a rear end of the switching circuit unit 20.

Furthermore, when the input for charging the battery 50 is provided at the time 'T1', the controller 100 may be configured to perform PWM control to repeatedly turn the switching circuit unit 20 on and off at a predetermined duty and the switching element Q1 of the power factor correction circuit unit 10 may be turned off. Accordingly, the switching circuit unit 20, the diode rectifier circuit unit 30, and the inductor L have a single buck converter structure. In other words, the controller 100 may be configured to operate the switching circuit unit 20 as the switching element of the buck converter to perform a voltage and current adjustment.

Particularly, the controller 100 may be configured to adjust the voltage and current in the PWM control of the buck converter configured of the switching circuit unit 20, the diode rectifier circuit unit 30, and the inductor L for a predetermined period of time (T1 to T2) after the charging operation of the charger starts, to thus charge the capacitor Cdc. The voltage/current control (e.g., the adjustment of the voltage and current) for the initial charging of the capacitor Cdc may be performed by the buck converter control during the initial stage of the charger operation, and thus the initial charging resistor and the relay which have been typically used may be replaced. In addition, the switching circuit unit 20 may be used to block the electrical connection between the external AC power and the circuits disposed at the rear end thereof before the charging starts, and therefore the relay disposed at the front end of the initial charging resistor may also be omitted.

As illustrated in FIG. 3, when the voltage of the capacitor Cdc reaches a desired level by the buck converter control of the controller 100 during the initial charging (time 'T2' of FIG. 4), the controller 100 may be configured to short the switching circuit unit 20 and repeatedly operate the switching element Q1 of the power factor correction circuit unit 10 at a predetermined duty to operate the power factor correction circuit unit 10 as a boost converter. Accordingly, the voltage of the capacitor Cdc may be further increased. In particular, the controller 100 may be configured to stop the buck converter control as described above at the time T2 when the voltage Vdc of the capacitor Cdc increases to the voltage required for the initial charging, and may be configured to perform the boost converter control of the power factor correction circuit unit 10 at the time 'T3' when a predetermined time period elapses after the short of the switching circuit unit 20 is maintained.

As described above, the charger according to various exemplary embodiments of the present invention may be configured to adjust the voltage and current by the buck converter control immediately after the charging operation starts, thereby eliminating the resistor and the relay that are typically used for blocking the rush current. Accordingly, it may be possible to decrease the size of the charger and reduce the overall manufacturing cost.

Additionally, the charger according to various exemplary embodiments of the present invention may be configured to determine the voltage by the external power before the external power is applied to the charger, thereby coping with the unspecified number of AC power sources by determining the input voltage. Further, the charger according to various exemplary embodiments of the present invention may eliminate the power loss due to the initial charging resistor by removing the initial charging resistor and the two relays that are typically used and prevent the lifespan of the charger from being deteriorated due to the breakage of the relay.

Therefore, it should be understood that the above-mentioned embodiments are not restrictive but are exemplary in all aspects. It is to be understood that the scope of the present invention will be defined by the claims rather than the above-mentioned description and all modifications and alternations derived from the claims and their equivalents are included in the scope of the present invention.

What is claimed is:

1. A charger, comprising:
a switching circuit unit configured to apply or block alternating current (AC) power input from an outside;
a power factor correction circuit unit configured to convert the AC power applied from the switching circuit unit into direct current (DC) power;
a DC-DC converter configured to convert a voltage level of the DC power converted by the power factor correction circuit unit and supply the converted voltage level of the DC power to an energy storage device;
a capacitor configured to be shunt-connected between the power factor correction circuit unit and the DC-DC converter; and
a controller configured to operate the switching circuit unit and the power factor correction circuit unit to charge the capacitor with a predetermined voltage in an initial stage of a charging operation of the energy storage device,
wherein the switching circuit unit includes:
a first switching element and a second switching element having a gate commonly receiving a control signal from the controller,
wherein each source of the first switching element and the second switching element is connected to each other and each drain thereof is connected to an AC power input terminal and an input terminal of the power factor correction circuit unit one by one, or each drain of the first switching element and the second switching element is connected to each other and each source thereof is connected to the AC power input terminal and the input terminal of the power factor correction circuit unit one by one.

2. The charger of claim 1, wherein the controller is configured to open the switching circuit unit prior to starting the charging operation and perform a pulse-width modulation (PWM) control on the switching circuit unit when the charging operation starts to supply a current to the capacitor.

3. The charger of claim 1, wherein the power factor correction circuit unit includes:
an inductor having a first end connected to the switching circuit unit, a diode having an anode connected to a second end of the inductor and a cathode connected to a first end of the capacitor; and
a switching element that forms or blocks an electrical connection between a connecting end of the inductor and the anode and a second end of the capacitor,
wherein the controller is configured to operate the switching circuit unit to be open or shorted and the switching element to be open or shorted to adjust a voltage applied to the capacitor.

4. The charger of claim 3, wherein the controller is configured to open the switching circuit unit prior to starting the charging operation, perform a pulse-width modulation (PWM) control on the switching circuit unit when the charging operation starts to open the switching element to charge the capacitor, and short the switching circuit unit and perform the PWM control on the switching element when the capacitor is charged at a preset voltage level or greater.

5. The charger of claim 1, wherein the first switching element is a first MOSFET and the second switching element is a second MOSFET.

6. The charger of claim 2, wherein the switching circuit unit includes:
a first MOSFET and a second MOSFET having a gate commonly receiving a control signal from the controller,
wherein each source of the first MOSFET and the second MOSFET is connected to each other and each drain thereof is connected an AC power input terminal and an input terminal of the power factor correction circuit unit one by one, or each drain of the first MOSFET and the second MOSFET is connected to each other and each source thereof is connected to the AC power input terminal and the input terminal of the power factor correction circuit unit one by one.

7. The charger of claim 3, wherein the switching circuit unit includes:
a first MOSFET and a second MOSFET having a gate commonly receiving a control signal from the controller,
wherein each source of the first MOSFET and the second MOSFET is connected to each other and each drain thereof is connected an AC power input terminal and an input terminal of the power factor correction circuit unit one by one, or each drain of the first MOSFET and the second MOSFET is connected to each other and each source thereof is connected to the AC power input terminal and the input terminal of the power factor correction circuit unit one by one.

8. The charger of claim 4, wherein the switching circuit unit includes:
a first MOSFET and a second MOSFET having a gate commonly receiving a control signal from the controller,
wherein each source of the first MOSFET and the second MOSFET is connected to each other and each drain thereof is connected an AC power input terminal and an input terminal of the power factor correction circuit unit one by one, or each drain of the first MOSFET and the second MOSFET is connected to each other and each source thereof is connected to the AC power input terminal and the input terminal of the power factor correction circuit unit one by one.

9. The charger of claim 1, further comprising:
a diode rectifier circuit unit disposed between the switching circuit unit and the power factor correction circuit unit.

10. A charger, comprising:
a switching circuit unit configured to apply or block alternating current (AC) power input from an outside;
a diode rectifier circuit unit configured to rectify the power applied from the switching circuit unit;
a power factor correction circuit unit configured to convert output power of the rectifier circuit unit into direct current (DC) power and be implemented as a boost converter topology including an inductor, a switching element, and a diode;
a DC-DC converter configured to convert a voltage level of the DC power converted by the power factor correction circuit and supply the converted DC power to an energy storage device;

a capacitor configured to be shunt-connected between the power factor correction circuit unit and the DC-DC converter; and a controller configured to operate the switching circuit unit and the power factor correction circuit unit to charge the capacitor with a predetermined voltage at an initial charging operation of the energy storage device, wherein the controller is further configured to:
- open the switching circuit unit prior to starting a charging operation,
- turn off the switching element when the charging operation starts and perform pulse-width modulation (PWM) control on the switching circuit unit to operate a circuit including the switching circuit unit, the diode rectifier circuit unit, and the inductor as a buck converter, and
- short the switching circuit unit and perform the PWM control on the switching element to operate the power factor correction circuit unit as a boost converter when the capacitor is charged at a preset voltage level or greater by the buck converter control.

11. The charger of claim 10, wherein the switching circuit unit includes:

a first MOSFET and a second MOSFET having a gate commonly receiving a control signal from the controller, wherein each source of the first MOSFET and the second MOSFET is connected to each other and each drain thereof is connected an AC power input terminal and an input terminal of the power factor correction circuit unit one by one, or each drain of the first MOSFET and the second MOSFET is connected to each other and each source thereof is connected to the AC power input terminal and the input terminal of the power factor correction circuit unit one by one.

* * * * *